(12) United States Patent
Sakurai et al.

(10) Patent No.: US 12,370,691 B2
(45) Date of Patent: Jul. 29, 2025

(54) MOBILE BODY, METHOD OF CONTROLLING MOBILE BODY, AND INFORMATION PROCESSING DEVICE

(71) Applicant: Sony Group Corporation, Tokyo (JP)

(72) Inventors: Tatsuma Sakurai, Tokyo (JP); Yusuke Kawabe, Tokyo (JP); Takatoshi Karino, Tokyo (JP); Naoki Kubokawa, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 138 days.

(21) Appl. No.: 18/007,488

(22) PCT Filed: Aug. 17, 2021

(86) PCT No.: PCT/JP2021/030044
§ 371 (c)(1),
(2) Date: Jan. 31, 2023

(87) PCT Pub. No.: WO2022/054508
PCT Pub. Date: Mar. 17, 2022

(65) Prior Publication Data
US 2023/0271328 A1 Aug. 31, 2023

(30) Foreign Application Priority Data
Sep. 10, 2020 (JP) .................. 2020-152309

(51) Int. Cl.
*B25J 11/00* (2006.01)
*B25J 9/16* (2006.01)
*A63H 11/20* (2006.01)

(52) U.S. Cl.
CPC ............ *B25J 11/003* (2013.01); *B25J 9/163* (2013.01); *B25J 9/1664* (2013.01); *A63H 11/20* (2013.01); *A63H 2200/00* (2013.01)

(58) Field of Classification Search
CPC ........ B25J 11/003; B25J 9/163; B25J 9/1664; A63H 11/20; A63H 2200/00; B62D 57/032
See application file for complete search history.

(56) References Cited

U.S. PATENT DOCUMENTS

| | | | | |
|---|---|---|---|---|
| 6,088,042 A | * | 7/2000 | Handelman | G06T 13/40 345/475 |
| 7,403,202 B1 | * | 7/2008 | Nash | G06T 7/246 345/474 |

(Continued)

FOREIGN PATENT DOCUMENTS

| | | |
|---|---|---|
| JP | 2000-149056 A | 5/2000 |
| JP | 2004-330361 A | 11/2004 |
| WO | 2019/087478 A1 | 5/2019 |

OTHER PUBLICATIONS

Anonymous: "Uni versal Robots—User Manual UR5/CB3. Versi on 3.3.3", Uni versal Robots—User Manual UR5/CB3, Dec. 31, 2016 (Dec. 31, 2016), pp. 1-189, XP055616454.

(Continued)

*Primary Examiner* — Sze-Hon Kong
(74) *Attorney, Agent, or Firm* — XSENSUS LLP

(57) ABSTRACT

To prompt generation of a new motion of a mobile body. The mobile body includes: a blending parameter setting section that sets a blending parameter; a motion generator that is configured to be able to generate a third motion by blending, into a predetermined first motion as a motion of the mobile body, a predetermined second motion as a motion of the mobile body different from the first motion with a reflection degree corresponding to the blending parameter set by the blending parameter setting section; and a motion controller that is configured to be able to reflect the third motion (Continued)

generated by the motion generator to a motion to be actually performed by the mobile body.

14 Claims, 10 Drawing Sheets

(56) References Cited

U.S. PATENT DOCUMENTS

| | | | | |
|---|---|---|---|---|
| 9,724,824 | B1* | 8/2017 | Annan | B25J 9/1615 |
| 9,796,095 | B1* | 10/2017 | Hanson | B25J 11/001 |
| 11,351,680 | B1* | 6/2022 | Rosenberg | B25J 19/0095 |
| 2011/0296306 | A1* | 12/2011 | Oddsson | G09B 5/06 |
| | | | | 715/717 |
| 2012/0086855 | A1* | 4/2012 | Xu | G06T 13/205 |
| | | | | 348/E9.034 |
| 2014/0125678 | A1* | 5/2014 | Wang | A63F 13/80 |
| | | | | 345/473 |
| 2014/0249676 | A1* | 9/2014 | Florencio | G06N 3/008 |
| | | | | 700/258 |
| 2017/0064926 | A1* | 3/2017 | Gutierrez | A01K 5/00 |
| 2017/0076194 | A1* | 3/2017 | Versace | G06N 3/02 |
| 2017/0125008 | A1* | 5/2017 | Maisonnier | G10L 13/08 |
| 2019/0111563 | A1* | 4/2019 | Stein | B25J 11/001 |
| 2021/0107163 | A1* | 4/2021 | Klingensmith | B25J 9/162 |
| 2021/0362343 | A1* | 11/2021 | Kim | B25J 13/081 |
| 2021/0375021 | A1* | 12/2021 | Starke | G06N 3/047 |
| 2022/0032458 | A1* | 2/2022 | Chu | B25J 11/0005 |
| 2023/0377238 | A1* | 11/2023 | Hutton | G06F 40/284 |

OTHER PUBLICATIONS

Groth Christian et al: "One-shot robot programming by demonstration by adapting motion segments", 2014 IEEE International Conference on Robotics and Biomimetics (ROBIO 2014), IEEE, Dec. 5, 2014 (Dec. 5, 2014), pp. 1068-1075, XP032765308.

Wu Xing et al: "Trajectory Planning With Lame-Curve Blending for Motor-Saturation Avoidance Upon Mobile-Robot Turning", IEEE Access, vol. 8, Mar. 22, 2020 (Mar. 22, 2020), pp. 58483-58496, XP011781640.

International Search Report and Written Opinion mailed on Oct. 26, 2021, received for PCT Application PCT/JP2021/030044, filed on Aug. 17, 2021, 10 pages including English Translation.

* cited by examiner

MOBILE BODY, METHOD OF CONTROLLING MOBILE BODY, AND INFORMATION PROCESSING DEVICE

CROSS-REFERENCE TO RELATED APPLICATIONS

This application is based on PCT filing PCT/JP2021/030044, filed on Aug. 17, 2021, which claims priority to Japanese Patent Application No. 2020-152309, filed Sep. 10, 2020, the entire contents of each are incorporated in this application by reference.

TECHNICAL FIELD

The present disclosure relates to a mobile body, a method of controlling a mobile body, and an information processing device.

BACKGROUND ART

A mobile body with predetermined executable motions has been known (PTL 1).

CITATION LIST

Patent Literature

PTL 1: International Publication No. WO2019/087478

SUMMARY OF THE INVENTION

In a case where a mobile body is to perform a new motion, generating the new motion from the beginning takes effort and time, and is costly for a less-experienced creator. Furthermore, there is a limit to creator's own ideas, which limits generatable motions.

An object of the present disclosure is to provide a mobile body, a method of controlling a mobile body, and an information processing device that make it possible to prompt generation of a new motion.

Problem to be Solved by the Invention

A mobile body according to an embodiment of the present disclosure includes: blending parameter setting section that sets a blending parameter; a motion generator that is configured to be able to generate a third motion by blending, into a predetermined first motion as a motion of the mobile body, a predetermined second motion as a motion of the mobile body different from the first motion with a reflection degree corresponding to the blending parameter set by the blending parameter setting section; and a motion controller that is configured to be able to reflect the third motion generated by the motion generator to a motion to be actually performed by the mobile body.

MODES FOR CARRYING OUT THE INVENTION

Figure 1:
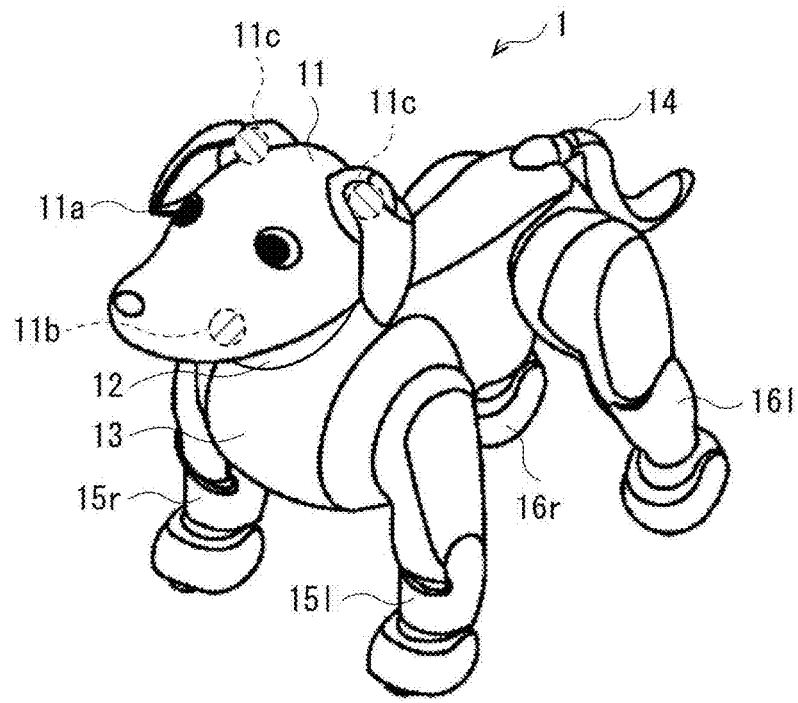
FIG. 1 is a perspective view of an appearance of a mobile body according to an embodiment of the present disclosure.

In the following, embodiments of the present disclosure are described in detail with reference to the drawings. The embodiments described below are specific examples of the present disclosure, and the technology according to the present disclosure is not limited to the following embodiments. In addition, arrangements, dimensions, and dimensional ratios of the respective components of the following embodiments are not limited to examples illustrated in the drawings.

Description is given in the following order.
1. Basic Configuration
1.1. Configuration of Mobile Body
1.2. Configuration of Movable Sections
2. Configuration and Operation of Control System
3. Description with Flowcharts
4. Workings and Effects
5. Conclusion

1. BASIC CONFIGURATION (1.1. Configuration of Mobile Body)

FIG. 1 is a perspective view of an appearance of a mobile body 1 according to an embodiment of the present disclosure.

The mobile body 1 according to the present embodiment is an autonomous mobile type quadrupedal walking robot that imitates the form of an animal (specifically, a dog). The mobile body 1 includes a head part 11, a neck part 12, a body part 13, a tail part 14, two front leg parts (a right front leg part 15r and a left front leg part 15l), and two back leg parts (a right back leg part 16r and a left back leg part 16l). Joints that are movable sections of the mobile body 1 are formed between these parts, and are drivable in a predetermined direction by actuators installed in the respective joints. The number of actuators provided in each of the joints is determined in accordance with a direction in which the joint is drivable. In the present embodiment, electric motors (servo motors) are adopted as the actuators.

The head part 11 of the mobile body 1 includes a display 11a and a speaker 11b, and also includes a microphone 11c. The display 11a is provided in a part corresponding to a dog's eye of the head part 11, and the speaker 11b is provided in a part corresponding to a mouth. FIG. 1 illustrates approximate positions of the speaker 11b and the microphone 11c to be next described in the head part 11. In the present embodiment, the display 11a has a configuration in which a picture or an image of a dog's eye is displayable, and the display 11a and the speaker 11b are used as means of attaching, to a motion to be performed by the mobile body 1, media set in association with the motion. The microphone 11c is provided in or near a part corresponding to a dog's ear. Each of a mouth part and an ear part is provided with an actuator and is operable, which allows a motion or gesture of the mobile body 1 to be close to that of an actual dog.

(1.2. Configuration of Movable Sections)

Figure 2:
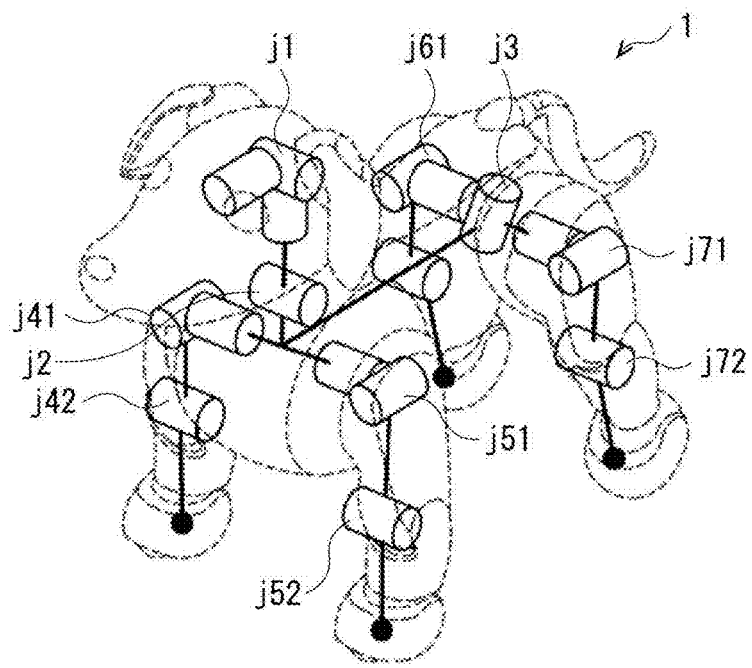
FIG. 2 is a schematic diagram schematically illustrating movable sections included in the mobile body according to the same embodiment.

FIG. 2 is a schematic diagram schematically illustrating a configuration of the movable sections included in the mobile body 1 according to the present embodiment.

In the present embodiment, as the joints that are movable sections, a joint j1 is provided between the head part 11 and the neck part 12; a joint j2 is provided between the neck part 12 and the body part 13; a joint j3 is provided between a front portion (that is, a chest part) and a rear portion (that is, a hip part) of the body part; a joint j41 is provided between a thigh part of the right front leg part 15r and the body part 13; a joint j42 is provided between the thigh part and a knee part of the right front leg part 15r; a joint j51 is provided between a thigh part of the left front leg part 15l and the body part 13; a joint j52 is provided between the thigh part and a knee part of the left front leg part 15l; a joint j61 is provided between a thigh part of the right back leg part 16r and the body part 13; a joint j62 (whose reference numeral is not illustrated in FIG. 2) is provided between the thigh part and a knee part of the right back leg part 16r; a joint j71 is provided between a thigh part of the left back leg part 16l and the body part 13; and a joint j72 is provided between the thigh part and a knee part of the left back leg part 16l.

Further, an actuator that is able to give a predetermined degree of freedom is installed in each of these joints, which makes it possible to implement a motion of the mobile body 1 that imitates a motion of an actual dog. For example, giving degrees of freedom in three directions to the head part 11 makes it possible to perform motions including nodding and tilting a head, and giving degrees of freedom in two directions to a thigh part of a leg (e.g., the right front leg part 15r) makes it possible to perform motions including spreading legs outward in addition to walking. It is possible to implement a more natural motion close to that of the actual dog by a combination of movements of these joints.

2. CONFIGURATION AND OPERATION OF CONTROL SYSTEM

Figure 3:
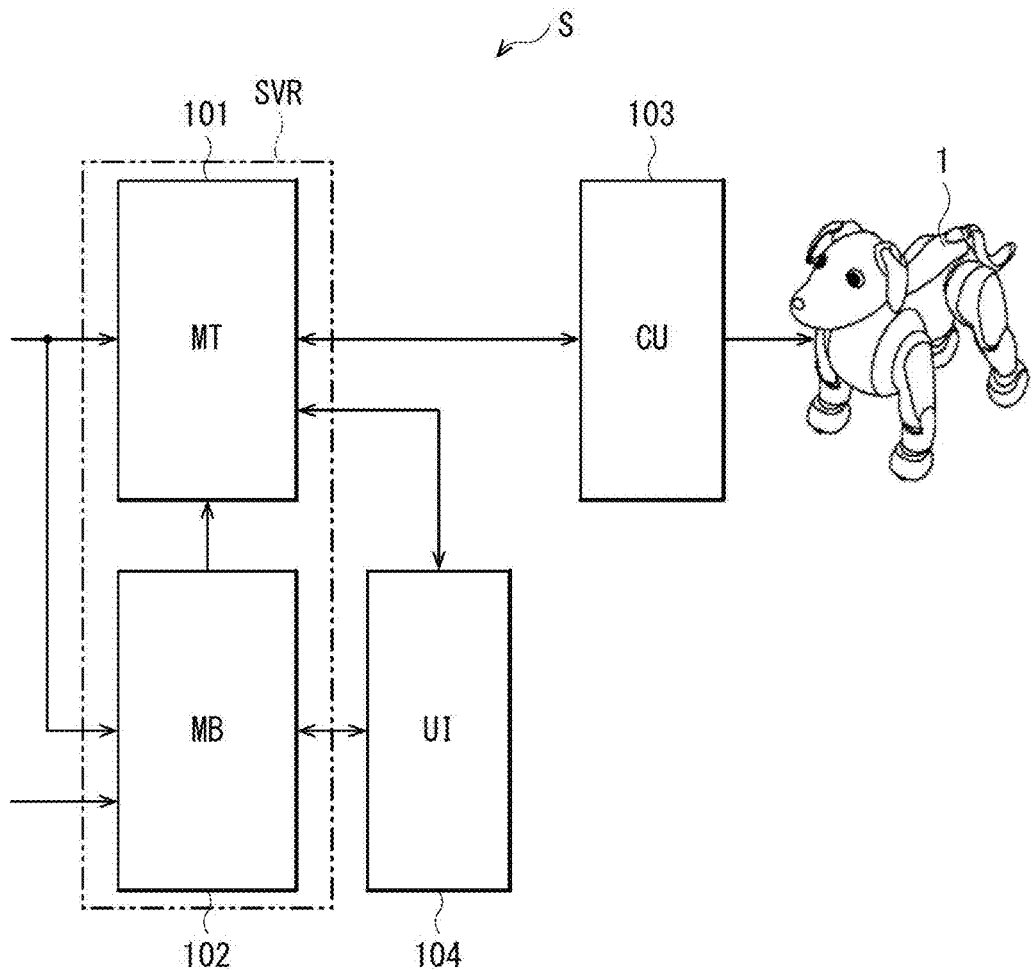
FIG. 3 is a block diagram illustrating an entire configuration of a control system of the mobile body according to the same embodiment.

FIG. 3 is a block diagram illustrating an entire configuration of a control system S of the mobile body 1 according to the present embodiment.

The control system S controls motions of the mobile body 1, specifically, rotation angles of electric motors included as actuators in the respective joints. The control system S is broadly divided into a mecanitage unit 101, a motion blender unit 102, and a actuator controller 103, which are provided separately from the mobile body (that is, a main body of a mobile body) 1, except for the actuator controller 103. In the present embodiment, the mobile body includes a main body 1 of the mobile body and the control system S, and hereinafter, the "mobile body" refers to the main body 1 of the mobile body. The control system S includes an interface device 104 in addition to the above components.

The mecanitage unit 101 sets a blending parameter, and generates a new motion to be performed by the mobile body 1 on the basis of the set blending parameter. As one example, the mecanitage unit 101 and the motion blender unit 102 to be next described are mountable on a computer that is a server SVR, and are installable at positions separated from the mobile body 1. The mecanitage unit 101 and the mobile body 1 (the actuator controller 103 in the present embodiment) are able to communicate with each other wirelessly or through a network line.

The motion blender unit 102 learns user's preference about a blending parameter, and presents a learned blending parameter (that is, a blending parameter corresponding to user's preference) as a proposal parameter to a user. In a case where the proposal parameter presented by the motion blender unit 102 is close to user's own preference, the user is able to select the proposal parameter as a blending parameter and specify the blending parameter.

The actuator controller 103 generates an actuator drive signal for causing the mobile body 1 to execute a new motion generated by the mecanitage unit 101. It is possible to separate the actuator controller 103 from the mecanitage unit 101 and the motion blender unit 102 and contain the actuator controller 103 in the mobile body 1.

The interface device 104 displays the proposal parameter presented by the motion blender unit 102, and prompts the user to specify the blending parameter. The user is able to specify the presented proposal parameter as a blending parameter related to user's own selection, that is, a blending parameter for causing the mobile body 1 to perform a motion close to user's own preference through the interface device 104. It is possible to embody the interface device 104 by a personal computer possessed or used by the user, and it is possible to prompt specification of the blending parameter by displaying the proposal parameter on a screen of the personal computer.

Figure 4:
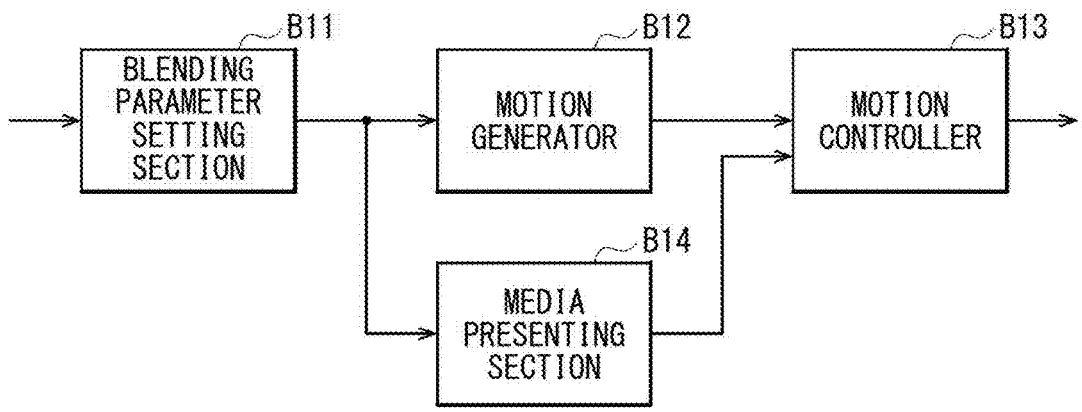
FIG. 4 is a block diagram illustrating a configuration of a portion involved in setting of a blending parameter and generation of a new motion based on the blending parameter in the control system according to the same embodiment.

FIG. 4 is a block diagram illustrating a configuration of the mecanitage unit 101 according to the present embodiment.

The mecanitage unit 101 includes a blending parameter setting section B11, a motion generator B12, a motion controller B13, and a media presenting section B14.

The blending parameter setting section B11 sets a blending parameter. The blending parameter is an index indicating a reflection degree of a second existing motion (that is, a second motion) as an object to be blended into a first existing motion (that is, a first motion) that is a base for generating a new motion. The first motion and the second motion are motions different from each other, and are predetermined, for example, as a set of time series of rotation angles of electric motors as actuators, and are stored in a storage section of the mecanitage unit 101, It is possible to read the first motion and the second motion from the mecanitage unit 101 as necessary. While the first motion basically includes one motion, the second motion may include one motion or a plurality of motions. In a case where there is a plurality of second motions, a blending parameter for each of the plurality of second motions is set.

In the present embodiment, as the first motion, a motion of swaying the body part 13 from side to side, that is, "body sway" is adopted, and as the second motion, the following two motions are adopted. The two motions include a motion of digging the ground with use of the front leg parts 15r and 15l, that is, "dig here", and a motion of swaying a hip part relative to a chest part of the body part 13, that is, "hip sway". The hip part is a rear half of the body part 13 and the chest part is a front half of the body part 13. The number of second motions is not limited, and may be two or more.

Figure 6:
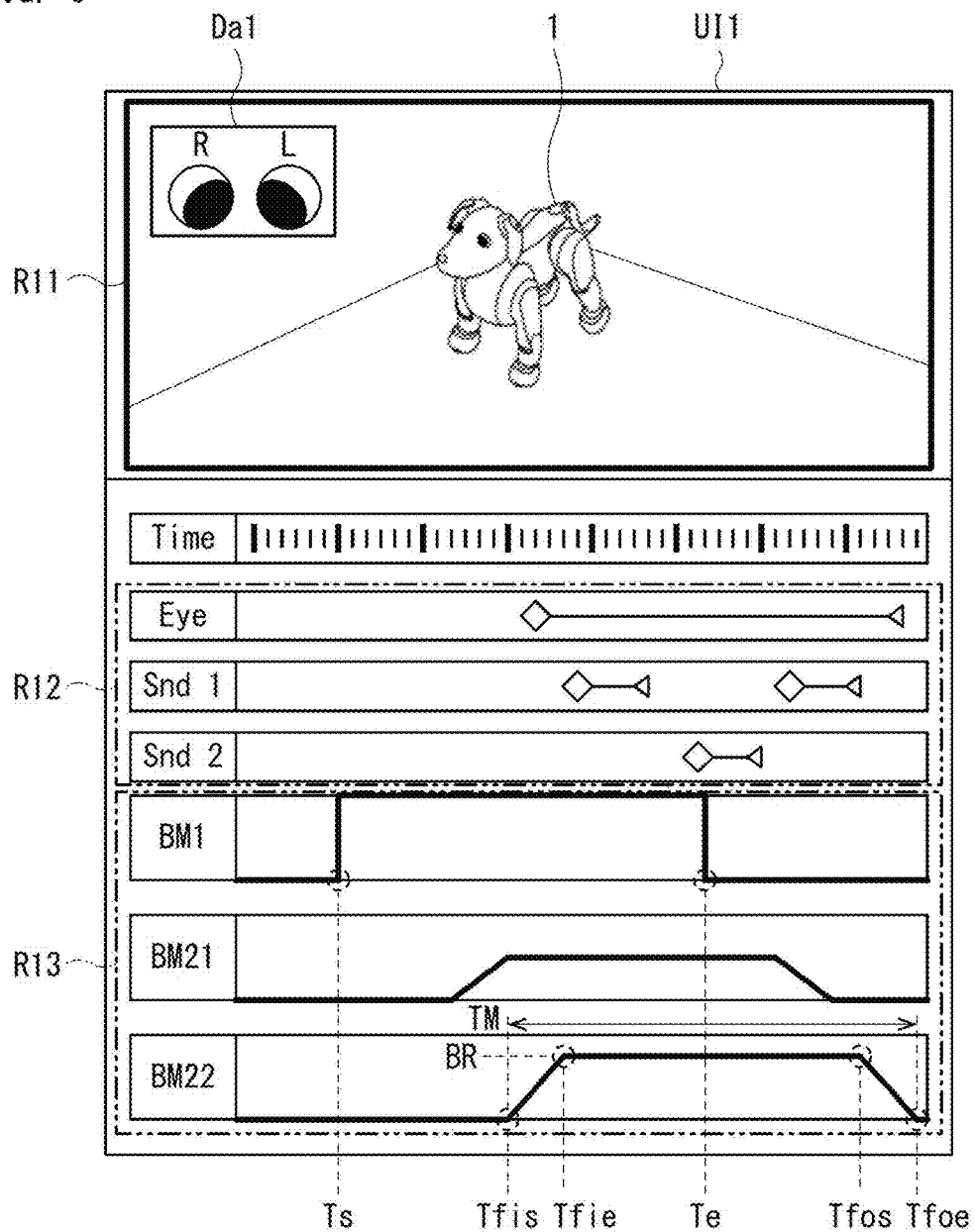
FIG. 6 is a schematic diagram schematically illustrating an appearance of a user interface used for setting of the blending parameter in the control system according to the same embodiment.

In the present embodiment, at each of start and end timings of reflection of the second motion, an operation of gradually increasing a reflection degree of the second motion and gradually decreasing the reflection degree. Referring to FIG. 6, in order to implement such an operation, adopted mixing parameters include a duration TM of reflection of the second motion, a ratio BR to the first motion in reflection of the second motion, a start time Tfis of reflection of the second motion, an end time Tfoe of reflection of the second motion, an end time Tfie of gradual increase in the reflection degree, and a start time Tfos of gradual decrease in the reflection degree. FIG. 6 illustrates a blending parameter specified for a second motion BM22 (that is, "hip sway") that is a second motion of the motions according to the present embodiment. Here, the start time Tfis of reflection of the second motion is able to translate to a start time of gradual increase in the reflection degree, and the end time Tfoe of reflection of the second motion is able to translate to an end time of gradual decrease in the reflection degree.

The motion generator B12 blends the second motion into the first motion with a reflection degree corresponding to a mixing parameter set by the mixing parameter generator B11 to generate a motion different from both the first and second motions, that is, a new motion (a third motion).

The motion controller B13 reflects the third motion generated by the motion generator B12 to a motion to be actually performed by the mobile body 1. In the present embodiment, the third motion is reflected by causing the mobile body 1 to execute the third motion itself, but this is not limitative. A signal from the motion controller B13 is inputted as a signal indicating a set of time series of the rotation angles of the actuators (electric motors) to the actuator controller 103, and the actuator controller 103 converts the inputted signal into a drive signal for each of the actuators, and outputs the drive signal to an actuator to be controlled.

The media presenting section B14 presents predetermined media perceptible by a user in association with the third motion. In the present embodiment, the predetermined media include visual and audio media, specifically image information that imitates a dog's eye and audio information that imitates dog barking. It is possible to present the image information on the dog's eye on the display 11a provided in the head part 11, and it is possible to present the audio information on barking by the speaker 11b.

In the present embodiment, media are preset in association with each of the first motion that is a base of generation and the second motion as an object to be blended, and media set in association with a motion having a superior reflection degree in the third motion, that is, a motion having a larger reflection degree in the third motion of the first and second motion is presented. For example, in a case where the ratio BR to the first motion in reflection of the second motion exceeds 1, media set in association with the second motion is presented.

Presentation of media is not limited thereto, and it is possible to present media set in association with a motion having a high final reflection degree in the third motion of the first and second motions. For example, in a case where the end time Tfie of gradual increase in the reflection degree of the second motion or the end time Tfoe of reflection of the second motion is later than an end time Te of the first motion, media set in association with the second motion is presented.

FIG. 6 illustrates a specific example of a screen (hereinafter referred to as "interface screen" in some cases) UI1 to be displayed by the interface device 104 according to the present embodiment for specification of the blending parameter.

The interface screen UI1 includes a plurality of regions R11, R21, and R13 separated from each other. The regions R11 to R13 may be partitioned, for example, by different screen planes or by interposing a black display section between different regions on the same screen plane (the same applies to the following description). A first region of the plurality of regions R11 to R13 is the region R11 that indicates an appearance of the mobile body 1 and demonstration of a motion by the mobile body 1. A second region is the region R12 that indicates information about media, and a third region is the region R13 that indicates information about the first motion and the second motion. As information about the first motion, it is possible to display a start time Ts of the first motion and the end time Te of the first motion, and as information about the second motion, it is possible to display a blending parameter of the second motion. The second region R12 includes, as display sections that display the information about media, a display section Eye that indicates start and end times of display of an image of the dog's eye on the display 11a, and display sections Snd1 and Snd2 that indicate start and end times of presentation of dog barking by the speaker 11b. In the present embodiment, as presentable dog barking, a plurality of types of barking (display sections Snd1 and Snd2) are set. It is possible to also display barking along with a waveform of the barking. As described above, the blending parameter includes the duration TM of reflection of the second motion, the ratio BR to the first motion in reflection of the second motion, the start time Tfis of reflection of the second motion, the end time Tfoe of reflection of the second motion, the end time Tfie of gradual increase in the reflection degree, and the start time Tfos of gradual decrease in the reflection degree. The third region R13 includes, as display sections in which information about the first and second motions is displayed, a display section BM1 that indicates a profile of the first motion, and display sections BM21 and BM22 that indicate a profile of the second motion. The user is able to change the blending parameter by changing a motion profile displayed on the third region R13 by an operation of a cursor on the screen or the like. It is also possible to change time of presenting media by an operation of the cursor on the screen or the like. Furthermore, in the present embodiment, a display section Da1 that indicates media contents, specifically an image of a dog's eye to be actually displayed on the display 11a is provided in the first region R11.

Figure 5:
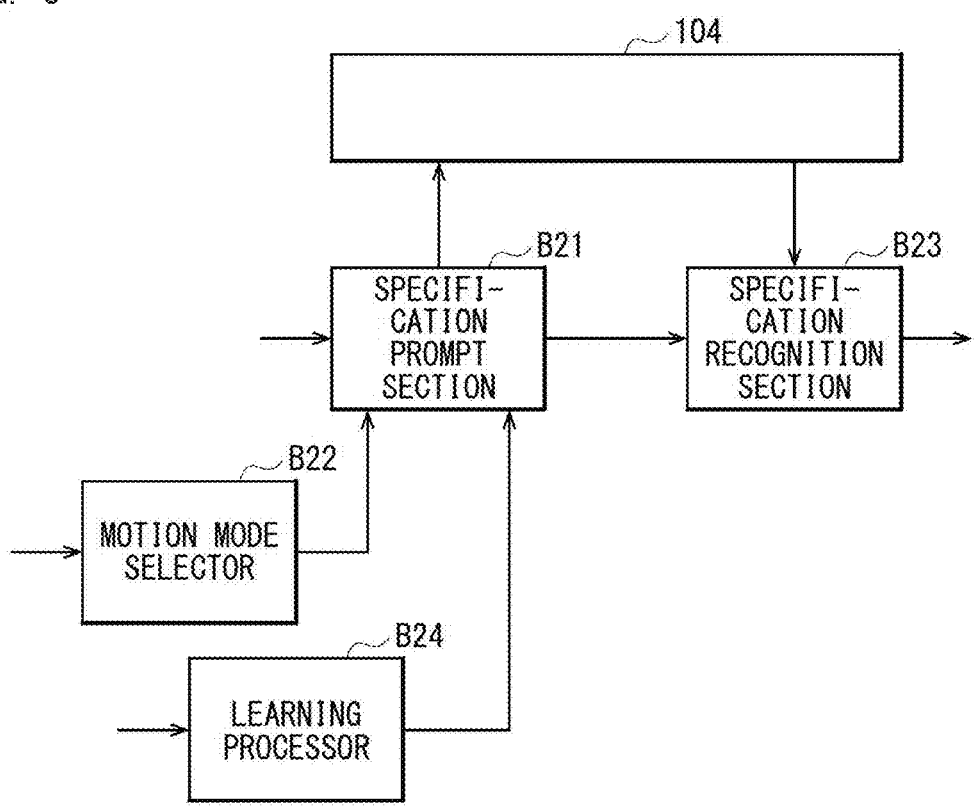
FIG. 5 is a block diagram illustrating a configuration of a portion involved in learning and proposal of the blending parameter if the control system according to the same embodiment.

FIG. 5 is a block diagram illustrating a configuration of the motion blender unit 102 according to the present embodiment. FIG. 5 also illustrates the interface device 104 for the sake of convenience.

The motion blender unit 102 includes a specification prompt section B21, a specification recognition section B22, a learning processor B23, and a motion mode selector B24.

The specification prompt section B21 prompts the user to specify the blending parameter. In the present embodiment, specification of the blending parameter is prompted by displaying a screen for specification of the blending parameter on the interface device 104. The user is able to specify the blending parameter through the screen displayed on the interface device 104.

In the present embodiment, the specification prompt section B21 displays the blending parameter that is a candidate of specification by the user as a proposal parameter on the screen of the interface device 104 to prompt specification of the blending parameter. Specification of the blending parameter is accomplished by selecting the proposal parameter by the user. The number of proposal parameters to be displayed may be one or more. It is also possible to prompt the user to directly input the blending parameter without displaying the proposal parameter.

The specification prompt section B21 displays a motion generated in accordance with the blending parameter that is the candidate of specification on the screen of the interface device 104 to present the proposal parameter. In other words, a demonstration image of the blending parameter that is the candidate of specification is displayed.

Here, in a case where a load exceeding an allowable range is applied to the actuator installed in any of the joints of the mobile body 1 in a motion generated in accordance with the blending parameter that is the candidate of specification, the specification prompt section B21 limits the blending parameter related to a movement of that joint. For example, in a case where in a motion generated by blending of the second motion, an excessively large change occurs in the rotation angle of the joint j1 between the head part 11 and the neck part 12, acceleration exceeding an allowable range occurs in the joint j1, and a load on the actuator installed in the joint J1 exceeds the allowable range, the blending parameter is set at 0 to exclude the second motion from the object to be blended. As the second motion that causes a load exceeding the allowable range on the actuator, it is possible to exemplify the second motion in a standing posture with respect to the first motion in a sitting posture. It is possible to limit the blending parameter not only by excluding the second motion that causes an issue from the object to be blended, but also by decreasing the ratio BR to the first motion in reflection of the second motion to lower than an original ratio and by extending time (=Tfie−Tfis) from start of reflection of the second motion to end of gradual increase in the reflection degree from an original time to reflect the second motion more gradually.

The motion mode selector B22 sets a motion mode corresponding to selection by the user. It is possible to select the motion mode by displaying a screen for motion mode selection on the interface device 104, and the user is able to select the motion mode through the screen displayed on the interface device 104. The specification prompt section B21 changes the proposal parameter in accordance with the selected motion mode.

As the motion mode, it is possible to exemplify a motion mode having significance of functions such as a motion mode that is resistant to breakdown and a motion mode in which battery consumption is suppressed, and a motion mode having significance of characters and feelings such as an angry motion mode and a happy motion mode.

As the former motion mode, it is possible to implement the motion mode that is resistant to breakdown as a motion mode in which acceleration caused in the joint is suppressed, and it is possible to implement the motion mode in which battery consumption is suppressed as a motion mode in which a change in posture is small and a load on the actuator is suppressed.

Furthermore, as the latter motion mode, it is possible to implement the angry motion mode as a motion mode in which movements of the joints are suppressed to cause a motion to appear slow, and it is possible to implement the happy motion mode as a motion mode in which the joints are largely moved to cause a motion to appear positive.

Figure 7:
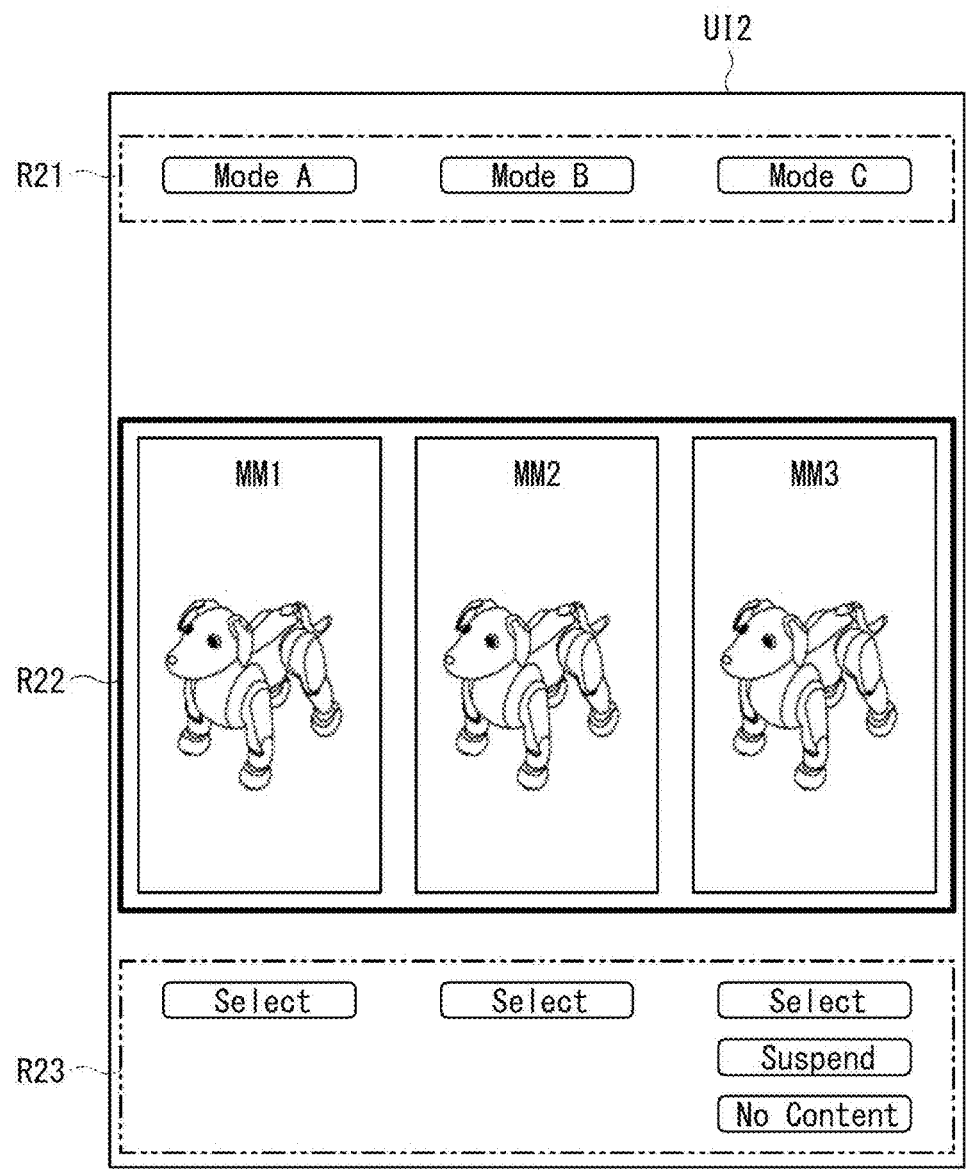
FIG. 7 is a schematic diagram schematically illustrating an appearance of a user interface used for proposal of the blending parameter (presentation of a proposal parameter) in the control system according to the same embodiment.

FIG. 7 illustrates a specific example of an interface screen UI2 to be displayed by the interface device 104 according to the present embodiment for proposal of the blending parameter (presentation of the proposal parameter).

The interface screen UI2 includes a plurality of regions R21, R22, and R23 separated from each other, as with the interface screen UI1 described above. A first region of the plurality of regions R21 to R23 is the region R21 that indicates selectable motion modes for a specific combination of the first and second motions. A second region is the region R22 that indicates demonstration of a motion by the mobile body 1 for each presented proposal parameter, and a third region is the region R23 in which selection of the proposal parameter by the user is executable. In the present embodiment, a motion mode is selectable from three alternatives. In relation to this, for example, the first region R21 has a "Mode A" button to select a normal motion mode, a "Mode B" button to select a motion mode that is resistant to breakdown, and a "Mode B" button to select a motion mode in which battery consumption is suppressed. The second region R22 is partitioned into three display sections. A first display section of the three display sections is a display section MM1 in which a motion based on a first proposal parameter presented by the motion blender unit 102 is displayed, a second display section is a display section MM2 in which a motion based on a second proposal parameter is displayed, and a third display section is a display section MM3 in which a motion based on a third proposal parameter is displayed. As a first adoptable proposal parameter, it is possible to exemplify an average value of all blending parameters to be specified with respect to a specific combination of the first and second motions. As a second adoptable proposal parameter, it is possible to exemplify a blending parameter obtained through a learned model to be described later, and as third adoptable proposal parameter, it is possible to exemplify an optional blending parameter of the blending parameters to be specified with respect to the specific combination of the first and second motions. The user is able to compare the proposal parameters by observing the motions of the mobile body 1 displayed in the second region R22 in synchronization with each other. The third region R23 has a "Select" button set in association with each of the proposal parameters, and the user is able to select a proposal parameter close to user's own preference by pushing the "Select" button. In the present embodiment, without limiting to alternative selection, it is possible to accept pushing the "Select" buttons related to the plurality of proposal parameters and assign ranks to selections by the user (specifically, a first rank, a second rank, and a third rank) in order of pushing the "Select" buttons, and it is possible to suspend selection by a "Suspend" button and to select not to specify any proposal parameter by a "No Contest" button. Assigning ranks to user's selections makes it possible to perform labeling of blending parameters to be used for mechanical learning, that is, learning data on the basis of the ranks. This makes it possible to reduce a burden for selecting only one proposal parameter as training data from the presented proposal parameters, reduce time necessary for labeling, and achieve simplification of a labeling work.

The specification recognition section B23 recognizes the blending parameter specified by the user through the interface device 104 as a specified parameter. The recognized specified parameter is inputted to the blending parameter setting section B11 of the mecanitage unit 101 to be set to the blending parameter.

The learning processor B24 learns user's preference related to specification of the blending parameter. Specifically, mechanical learning in which training data about the blending parameter is determined is executed on the second motion as the object to be blended into the first motion to generate a learned model of the blending parameter. After generation of the learned model, the specification prompt section B21 presents a blending parameter obtained through the learned model by the learning processor B24 as a proposal parameter. Thus, the blending parameter obtained through the learned model is included in an object to be specified by the user.

In the present embodiment, as the mechanical learning, supervised learning using a neural network is executed. As a neural network applicable to learning, it is possible to exemplify a neural network having a typical structure including a plurality of nodes arranged in an input layer, a plurality of node arranged in a middle layer, and a plurality of nodes arranged in an output layer. The number of nodes arranged in the output layer is equal to the number of blending parameters. The number of middle layers may be one or more. Typically, adoption having two middle layers is adopted, and a plurality of nodes arranged in a first middle layer and a plurality of nodes arranged in a second middle layer are provided. Furthermore, weights indicating synaptic connection strength between layers are set between the node in the input layer and the node in the middle layer and between the node in the middle layer and the node in the output layer. The learning processor B24 learns correlation between the first and second motions that are input layer variables and the blending parameter that is an output layer variable on the basis of the neural network having such a structure. Specifically, the value of the node in the output layer with respect to the value of the node in the input layer is calculated by a typical output layer calculation method using an activation function, and the calculated value of the node in the output layer is compared with a value of the training data to calculate an error therebetween. The learning processor B24 adjusts the weight of synaptic connection to decrease this error. It is possible to adjust the weight by a back propagation method, for example. Learning ends when the above processes has been repeated a predetermined times or when the error falls within a predetermined range, and a learned model is determined by a weight finally obtained.

In the present embodiment, in generation of the learned model, it is possible to present a predetermined blending parameter to the user and perform adjustment for bringing this blending parameter close to a blending parameter closer to user's own preference. In this case, the learning processor B24 executes mechanical learning using the adjusted blending parameter as training data.

Figure 8:
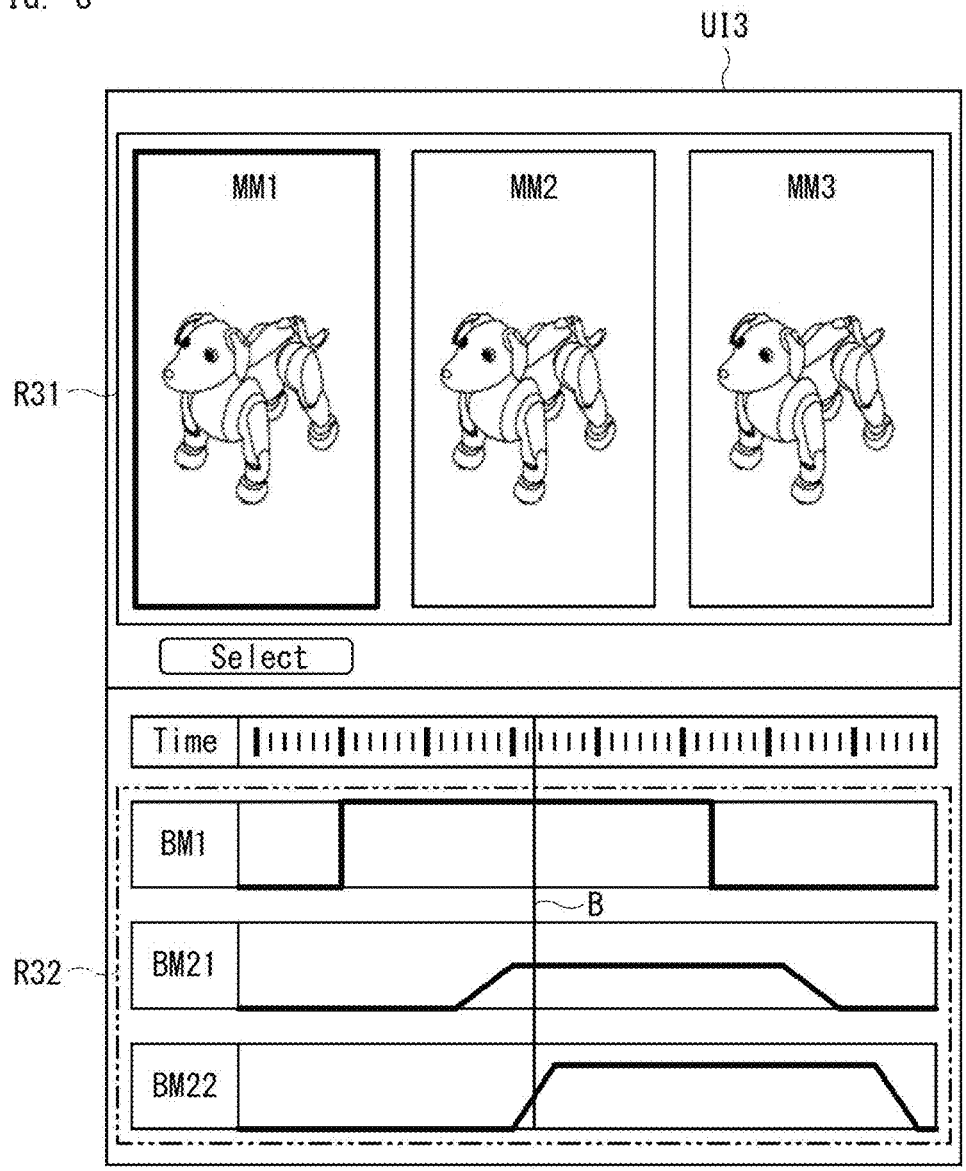
FIG. 8 is a schematic diagram schematically illustrating an appearance of a user interface used for proposal of the blending parameter and adjustment of the blending parameter by a user in the control system according to the same embodiment.

FIG. 8 illustrates a specific example of an interface screen UI3 to be displayed by the interface device 104 according to the present embodiment for proposal of the blending parameter and adjustment of the blending parameter by the user.

The interface screen UI3 includes a plurality of regions R31 and R32 separated from each other. A first region of the plurality of regions R31 and R32 is the region R31 that indicates demonstration of a motion by the mobile body 1 for each presented proposal parameter, and includes a display section MM2 in which a motion based on the blending parameter obtained through the learned model is displayed, as with the second region R22 in the interface screen UI2. A second region is the region R32 that indicates information about the first motion and the second motion, and includes a display section BM1 in which the start time Ts of the first motion and the end time Te of the first motion are displayed, and display sections BM21 and BM22 in which the blending parameter of the second motion is displayed, as with the third region R13 in the interface screen UI1. In the present embodiment, profiles of the first and second motions related to the proposal parameter selected in the first region R31 are displayed in the second region R32, and the user is able to observe and compare every moment of the posture of the mobile body 1 in a motion based on each proposal parameter in the first region R31 by moving a scroll bar B displayed in the second region R32 forward and backward.

Figure 9:
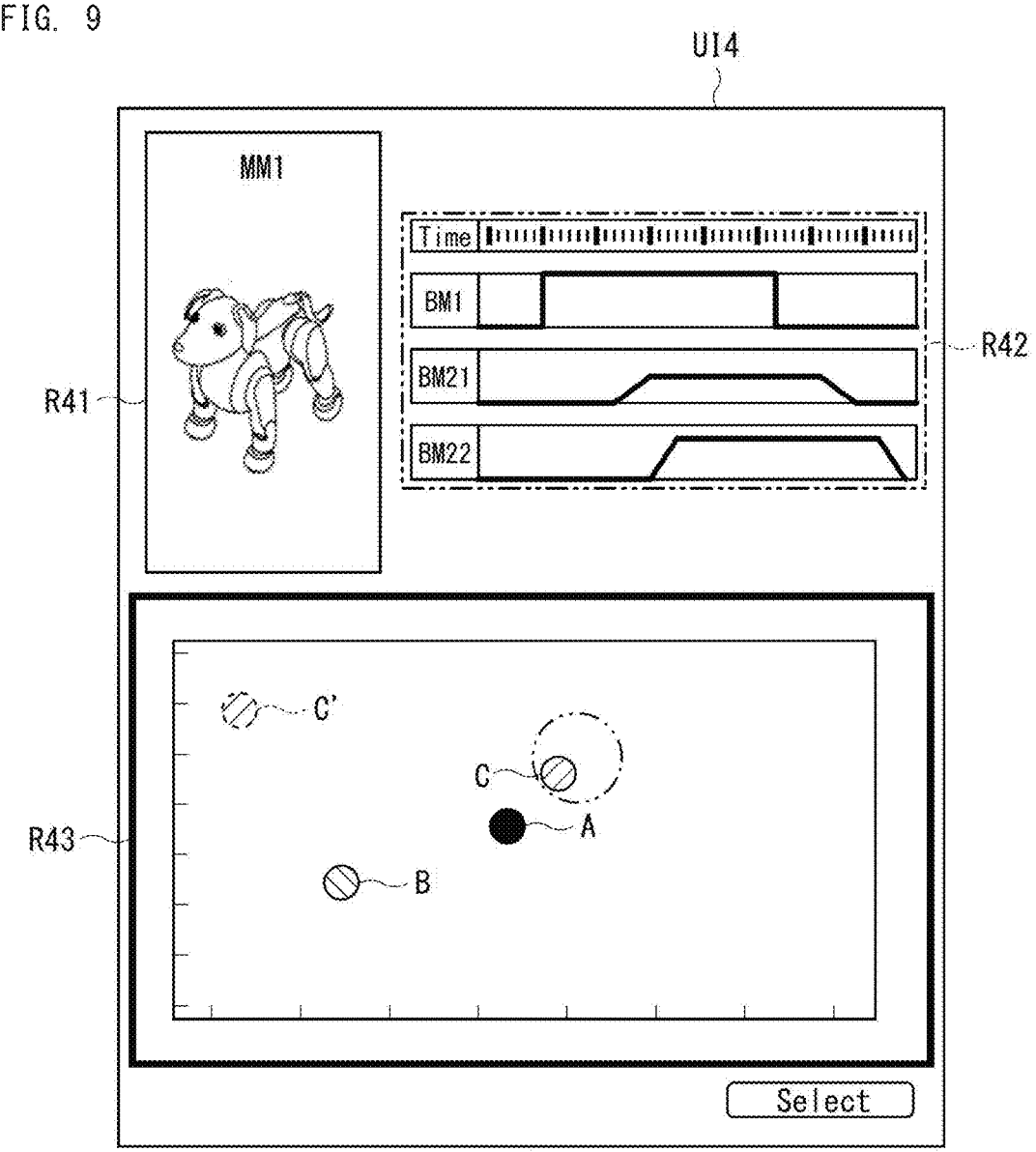
FIG. 9 is a schematic diagram schematically illustrating an appearance of a user interface according to a modification example used for proposal of the blending parameter and adjustment of the blending parameter by a user in the control system according to the same embodiment.

FIG. 9 illustrates an interface screen UI4 according to a modification example to be displayed by the interface device 104 according to the present embodiment for proposal of the blending parameter and adjustment of the blending parameter by the user.

The interface screen UI4 includes a plurality of regions R41 to R43 separated from each other. A first region of the plurality of regions R41 to R43 is the region R41 that indicates demonstration of a motion based on the selected proposal parameter. A second region is the region R42 that indicates information about the first motion and the second motion, and is similar to the third region R13 in the interface screen UI1 and the second region R32 in the interface screen UI3. A third region is the region R43 in which a two-dimensional parameter into which the proposal parameter presented by the motion blender unit 102 is converted is displayed. It is possible to convert a multi-dimensional proposal parameter into a two-dimensional parameter, for example, by performing T-distributed Stochastic Neighbor Embedding (t-SNE). In the present embodiment, in the third region R43, it is possible to display, as proposal parameters, an average value A of all blending parameters to be specified with respect to a specific combination of the first and second motions, a blending parameter B obtained through the learned model, an optional blending parameter C of the blending parameters to be specified with respect to the specific combination of the first and second motions. This makes it possible for the user to understand a relationship between a plurality of proposal parameters presented and select a proposal parameter close to user's own preference on the basis of display of the two-dimensional parameter. The optional blending parameter C may be completely optional, or may be extracted from a vector space close to an optional blending parameter presented in the past (proposal parameter C), or a blending parameter C' having an extreme value.

3. DESCRIPTION WITH FLOWCHARTS

Figure 10:
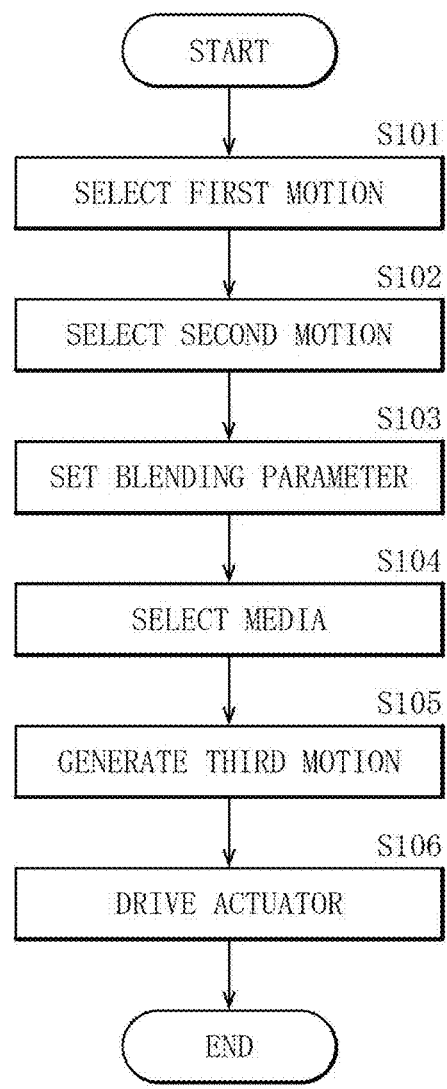
FIG. 10 is a flowchart illustrating a flow of setting of the blending parameter and control of a motion based on the blending parameter as an operation of the control system according to the same embodiment.

FIG. 10 is a flowchart illustrating a flow of setting of the blending parameter control of a motion based on and the blending parameter as an operation of the control system according to the present embodiment. Processes according to the flowchart in FIG. 10 are executed for each generation of the third motion by the mecanitage unit 101 of the control system S.

In S101, a first existing motion (first motion) that is a base of generation is selected.

In S102, a second existing motion (second motion) as an object to be blended is selected.

In S103, the blending parameter is set.

In S104, media are selected to be attached to the third motion that is to be newly generated.

In S105, the third motion is generated by blending the second motion into the first motion with a reflection degree corresponding to the blending parameter.

In S106, on the basis of the third motion and media in association with the third motion, a drive signal for an actuator included in each joint is generated, and a drive signal for the display 11a and the speaker 11b is generated.

Figure 11:
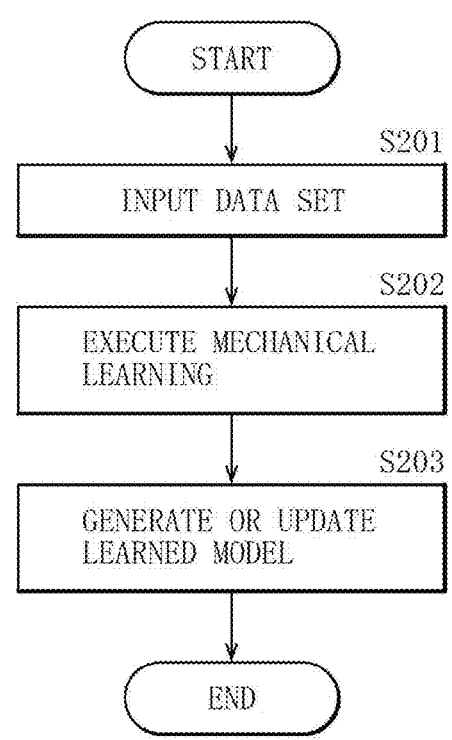
FIG. 11 is a flowchart illustrating a flow of learning of the blending parameter as an operation of the control system according to the same embodiment.

FIG. 11 is a flowchart illustrating a flow of learning of the blending parameter as an operation of the control system according to the present embodiment. Processes according to the flowchart in FIG. 10 are executed for each learning of the blending parameter by the motion blender unit 102 of the control system S.

In S201, a data set for learning is inputted. The data set includes types of the first motion (e.g., "body sway") and the second motion (e.g., "hip sway") to be used for learning and the blending parameter selected by the user for the first and second motions.

In S202, mechanical learning is executed with use of the types of the first and second motions as input layer variables and the blending parameter selected by the user as training data.

In S203, a learned model is generated, or a learned model generated in the past is updated.

Figure 12:
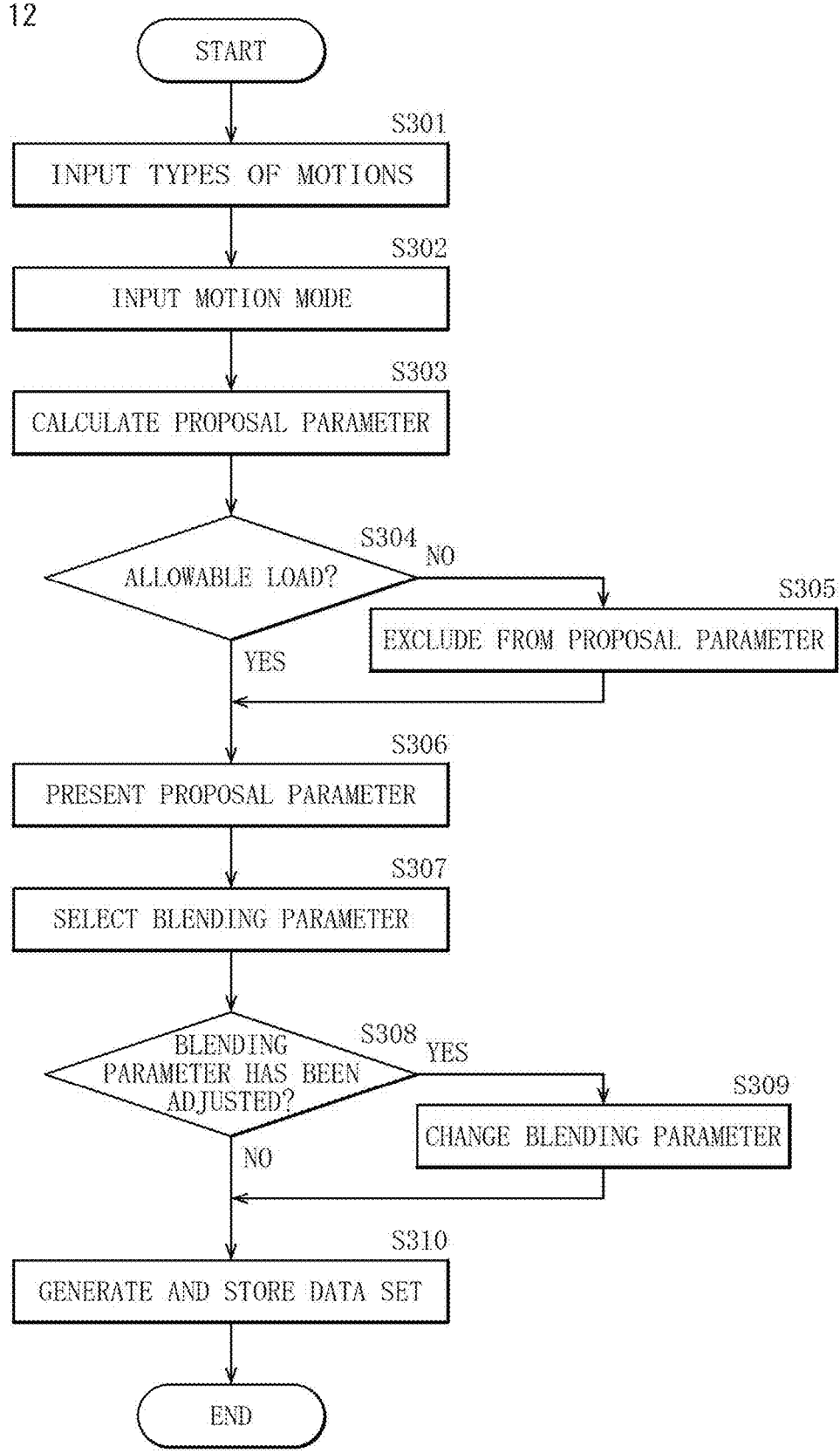
FIG. 12 is a flowchart illustrating a flow of proposal of the blending parameter and adjustment of the blending parameter by a user as an operation of the control system according to the same embodiment.

FIG. 12 is a flowchart illustrating a flow of proposal of the blending parameter and adjustment of the blending parameter by the user as an operation of the control system S according to the present embodiment. Processes according to the flowchart in FIG. 12 are executed for each specification of the blending parameter, that is, each generation of the third motion by the motion blender unit 102 of the control system S.

In S301, the types of the first motion and the second motion selected by the user are inputted.

In S302, the motion mode selected by the user is inputted.

In S303, the proposal parameter is calculated by the learned model.

In S304, in an operation in which the proposal parameter is calculated as the blending parameter, whether or not each of loads on the actuators installed in the joints included in the mobile body 1 is within an allowable range is determined. In a case where all the loads are within the allowable range, the flow proceeds to S306, and in a case where any of the loads exceeds the allowable range, the flow proceeds to S305.

In S305, the proposal parameter is excluded from an actual proposal object.

In S306, the proposal parameter is presented to prompt the user to specify the blending parameter.

In S307, the blending parameter specified by the user is recognized.

In S308, whether or not adjustment of the specified blending parameter has been executed by the user is determined. In a case where adjustment has been executed, the flow proceeds to S309, and in a case where the adjustment has not been executed, the flow proceeds to S310.

In S309, the blending parameter is changed to the adjusted blending parameter.

In S310, a data set is generated and stored. The generated data set is reflected to the next and subsequent learning.

4. WORKINGS AND EFFECTS

In a case where a mobile body is to perform a new motion, generating the new motion from the beginning by a user (e.g., a creator or a designer) takes effort and time, and is costly for a less-experienced creator. Furthermore, there is a limit to creator's own ideas, which limits generatable motions. Here, in a case where a certain value is to be given specifically to a motion to be newly performed, such issues become more pronounced. A value given to a motion is a value that brings a substantial profit to the user (that is, a customer) of the mobile body, and examples of a motion having such a value include carrying a heavy load to help the user, monitoring the inside of a room to reassure the user, and exhibiting an adorable behavior to impress the user.

According to the present embodiment, the predetermined first and second motions are blended to generate a new third motion, and this third motion is allowed to be reflected to a motion to be actually performed by the mobile body 1, which makes it possible to reduce effort and time necessary for generation and implementation of the new motion and reduce cost. Furthermore, it is possible to prompt generation of a motion that is not bounded by user's own ideas, that is, a motion that exceeds the limit of user's own ideas.

It is possible to present media in association with the third motion, which makes it possible to prompt the user to understand a value to be given to the third motion and achieve clarification of the value to be given to the third motion.

The user is prompted to specify the blending parameter, and the blending parameter specified by the user is recognized as a specified parameter and is allowed to be reflected to blending of the second motion (that is, generation of the third motion), which makes it possible to reflect user's preference to generation of the third motion through specification of the blending parameter. Here, it is possible to generate the third motion by blending the second motion with a reflection degree corresponding to the blending parameter specified by the user; therefore, it is not necessary to individually specify each of movements of all movable sections. This makes it possible to reduce a burden of the user necessary for generation of the third motion and reduce time.

The blending parameter that is a candidate of specification is presented as the proposal parameter, and is allowed to be specified by the user, which makes it possible to generate the third motion corresponding to user's preference by correcting the third motion generated on the basis of the specified blending parameter (specified parameter) as necessary. This makes it possible to further reduce the burden of the user.

Mechanical learning using the blending parameter specified by the user as training data is executed on the first and second motions to enable calculation of the blending parameter by the generated learned model, which makes it possible to propose the blending parameter to which user's preference is reflected (in other words, a blending parameter for generating the third motion close to user's preference) only by specification of the first and second motions. This makes it possible to further reduce effort and time necessary for generation of the third motion.

5. CONCLUSION

The embodiment according to the present disclosure has been described in detail with reference to the drawings.

According to the embodiment according to the present disclosure, it is possible to prompt generation of a new motion of a mobile body.

The technology according to the present disclosure is not limited to the embodiments described above, and may be modified in a variety of ways, and a combination of modification examples is also possible. In the above description, an animal (specifically, dog)-shaped mobile body is adopted as a mobile body; however, adoptable mobile bodies may include a humanoid-shaped mobile body and mobile bodies that imitate the forms of animals and living organisms other than a dog, and may include not only a mobile body that is movable by a function of an organ (e.g., a leg) of an animal or a living organism but also a mobile body movable with a wheel. In the present specification, the wheel is regarded as a means for enabling movement, and is not limited to a ring body rotatable about a an axle shaft, and is understood as a concept including a rolling body with no axle shaft such as a ball caster and a band body such as a caterpillar.

Furthermore, in the above description, the mobile body (that is, the main body of the mobile body) 1 and the control unit S are separately configured; however, the configuration is not limited thereto. It is possible to integrate functions of the control unit S into the main body 1 of the mobile body, and execute learning, proposal, and setting of the blending parameter and generation of the third motion by a computer included in the main body 1 of the mobile body. In this case, it is possible to embody, by a personal computer, an interface device on which the user performs specification, selection or the like of the blending parameter.

Furthermore, in the above description, a plurality of proposal parameters or a plurality of motions based on the presented proposal parameters are displayed side by side on the interface device 104; however, it is possible to display motions based on individual proposal parameters superimposed on each other. This makes it possible for the user to easily understand a difference between motions for respective proposal parameters.

Furthermore, in the above description, a physically existing mobile body such as a robot is adopted as an object to perform a motion, and the third motion is reflected to a change in the direction, posture, and the like of the mobile body itself (that is, a motion of the mobile body); however, an adoptable object is not limited thereto, and a virtually existing mobile body may be adopted. For example, a display section is provided in an interface device, and an object and a motion of the object are displayed on the display section. It is possible to embody the interface device in this case by a smartphone or a tablet computer, and the third motion is reflected to a motion of an image (that is, a change in the image) displayed on a screen of the smartphone or the tablet computer. It is possible to exemplify an image imitating any of various types of autonomous mobile type robots as an image to be displayed, that is, an object.

Further, not all of the configurations and operations described in the respective embodiments are indispensable as the configurations and operations of the present disclosure. For example, among the components in the respective embodiments, components not described in the independent claim indicating the most significant concepts of the present disclosure are to be understood as optional components.

Terms used throughout this specification and the appended claims should be construed as "non-limiting" terms. For example, the term "including" or "included" should be construed as "not limited to what is described as being included". The term "having" should be construed as "not limited to what is described as being had".

The terms used herein are used merely for the convenience of description and include terms that are not used to limit the configuration, the operation, and the like. For example, the terms such as "right", "left", "up", and "down" only indicate directions in the drawings being referred to. In addition, the terms "inside" and "outside" only indicate a direction toward the center of a component of interest and a direction away from the center of a component of interest, respectively. The same applies to terms similar to these and to terms with the similar purpose.

The technology according to the present disclosure may have the following configurations. According to the technology according to the present disclosure having the following configurations, a plurality of predetermined motions are blended to generate a new motion, and this new motion is allowed to be reflected to a motion to be actually performed by a mobile body, which makes it possible to reduce effort and time necessary for generation of the new motion and reduce cost. Furthermore, it is possible to prompt generation of a new motion that is not bounded by user's own ideas. Effects attained by the technology according to the present disclosure are not necessarily limited to the effects described herein, but may include any of the effects described in this specification.

(1)

A mobile body including:
- a blending parameter setting section that sets a blending parameter;
- a motion generator that is configured to be able to generate a third motion by blending, into a predetermined first motion as a motion of the mobile body, a predetermined second motion as a motion of the mobile body different from the first motion with a reflection degree corresponding to the blending parameter set by the blending parameter setting section; and
- a motion controller that is configured to be able to reflect the third motion generated by the motion generator to a motion to be actually performed by the mobile body.

(2)

The mobile body according to (1), further including a media presenting section that is configured to be able to present predetermined media perceptible from outside of the mobile body in association with the third motion.

(3)

The mobile body according to (2), in which the predetermined media include visual media.

(4)

The mobile body according to (3), in which the predetermined media include audio media.

(5)

The mobile body according to any one of (2) to (4), in which
- media set in association with each of the first and second motions are included, and
- the predetermined media include media set in association with a motion having a superior reflection degree in the third motion of the first and second motions.

(6)

The mobile body according to any one of (2) to (4), in which
- media set in association with each of the first and second motions are included, and
- the predetermined media include media set in association with a motion having a high final reflection degree in the third motion of the first and second motions.

(7)

The mobile body according to any one of (1) to (6), further including:
  a specification prompt section that is configured to prompt a user to specify the blending parameter; and
  a specification recognition section that is configured to be able to recognize the blending parameter specified by the user as a specified parameter, in which
  the blending parameter setting section sets the specified parameter recognized by the specification recognition section to the blending parameter.

(8)

The mobile body according to (7), in which the specification prompt section presents, as a proposal parameter, a blending parameter that is a candidate of specification by the user to prompt specification of the blending parameter.

(9)

The mobile body according to (8), in which the specification prompt section displays a motion generated in accordance with the blending parameter that is the candidate of specification to present the proposal parameter.

(10)

The mobile body according to (8) or (9), in which the specification prompt section presents, as the proposal parameters, a plurality of blending parameters that are the candidates of specification.

(11)

The mobile body according to any one of (8) to (10), in which, in a case where a load on a movable section of the mobile body exceeds an allowable range in a motion generated in accordance with the blending parameter that is the candidate of specification, the specification prompt section limits the blending parameter related to a movement of the movable section.

(12)

The mobile body according to any one of (8) to (11), further including a motion mode selector that is configured to be able to select a motion mode of the mobile body by the user, in which
  the specification prompt section changes the proposal parameter in accordance with the motion mode selected by the user.

(13)

The mobile body according to any one of (8) to (12), further including a learning processor that is configured to be able to generate a learned model of the blending parameter by executing mechanical learning, in which training data about the blending parameter is determined, on the second motion as an object to be blended into the first motion, in which
  the specification prompt section presents, as the proposal parameter, a blending parameter calculated by the learned model on the basis of the first and second motions.

(14)

The mobile body according to (13), in which
  the specification prompt section presents, as the proposal parameter, a plurality of blending parameters that are objects of the specification, and prompts specification of one or some blending parameters from among the plurality of blending parameters, and
  the learning processor executes the mechanical learning using the one or some blending parameters specified as training data.

(15)

The mobile body according to (14), in which the learning processor assigns ranks to respective blending parameters upon specifying the some blending parameters, and executes the mechanical learning on the basis of the ranks.

(16)

The mobile body according to (13), in which the learning processor is configured to present a predetermined blending parameter in generation of the learned model and be able to adjust the presented blending parameter by the user, and executes the mechanical learning using the blending parameter adjusted by the user as the training data.

(17)

A method of controlling a mobile body including:
  prompting a user to specify a blending parameter;
  generating a third motion by blending, into a predetermined first motion as a motion of a mobile body, a predetermined second motion as a motion of the mobile body different from the first motion with a reflection degree corresponding to the blending parameter specified by the user; and
  reflecting the third motion to a motion to be actually performed by the mobile body.

(18)

An information processing device including:
  a command generator that is configured to be able to output, to an interface device, a command to execute an operation of prompting a user to specify a blending parameter;
  a blending parameter input section that is configured to be able to input a blending parameter specified by the user;
  a motion generator that is configured to be able o generate a third motion by blending, into a predetermined first motion as a motion of an object, a predetermined second motion as a motion of the object different from the first motion with a reflection degree corresponding to the blending parameter inputted to the blending parameter input section; and
  a motion controller that is configured to be able to reflect the third motion generated by the motion generator to a motion to be actually performed by the object.

(19)

The information processing device according to (18), in which the object includes a mobile body.

(20)

The information processing device according to (18), in which
  the object includes a display section, and
  the motion of the object involves a motion of an image displayed on the display section.

It should be understood by those skilled in the art that various modifications, combinations, sub-combinations, and alterations may occur depending on design requirements and other factors insofar as they are within the scope of the appended claims or the equivalents thereof.

The invention claimed is:

1. A mobile body comprising:
  circuitry configured to
    set a blending parameter;
    generate a third motion by blending a predetermined first motion as a motion of the mobile body and a predetermined second motion as a motion of the mobile body different from the predetermined first motion with a reflection degree corresponding to the blending parameter;
    reflect the third motion to a motion to be actually performed by the mobile body; and
    present predetermined media perceptible from outside of the mobile body in association with the third motion, wherein the mobile body further comprises media associated with each of the predetermined first motion and the predetermined second motion, and the predetermined media is the media associated with one of the predetermined first motion and the predetermined second motion whose reflection degree in the third motion is larger than that of the other.

2. The mobile body according to claim 1, wherein the predetermined media include visual media.

3. The mobile body according to claim 1, wherein the predetermined media include audio media.

4. A mobile body comprising:
circuitry configured to
set a blending parameter;
generate a third motion by blending a predetermined first motion as a motion of the mobile body and a predetermined second motion as a motion of the mobile body different from the predetermined first motion with a reflection degree corresponding to the blending parameter;
reflect the third motion to a motion to be actually performed by the mobile body;
prompt a user to specify the blending parameter;
recognize the blending parameter specified by the user as a specified parameter; and,
set the specified parameter to the blending parameter; wherein
the circuitry is further configured to generate a learned model of the blending parameter by executing mechanical learning, in which training data about the blending parameter is determined on the predetermined second motion to be blended with the predetermined first motion; and
present a proposal parameter that is calculated with the learned model based on the predetermined first motion and the predetermined second motion, and prompt the user to specify the proposal parameter as the blending parameter.

5. The mobile body according to claim 4, wherein
the circuitry is further configured to display on a display a motion generated in accordance with the proposal parameter.

6. The mobile body according to claim 4, wherein
the circuitry is further configured to present a plurality of proposal parameters, and prompt the user to specify one of the plurality of proposal parameters as the blending parameter.

7. The mobile body according to claim 4, wherein
in a case where a load on a movable section of the mobile body exceeds an allowable range in a motion generated in accordance with the proposal parameter, the circuitry is further configured to limit the proposal parameter related to a movement of the movable section.

8. The mobile body according to claim 4, wherein
the circuitry is further configured to set a motion mode of the mobile body that is selected by the user, and change the proposal parameter in accordance with the motion mode selected by the user.

9. The mobile body according to claim 4, wherein
the circuitry is further configured to present a plurality of proposal parameters and prompt the user to specify at least one blending parameter from among the plurality of proposal parameters, and
execute the mechanical learning using the at least one blending parameter that is specified as the training data.

10. The mobile body according to claim 9, wherein
under a condition that the user specifies plural blending parameters from among the plurality of proposal parameters, the circuitry is further configured to assign ranks to each of the plural blending parameters and execute the mechanical learning based on the ranks.

11. The mobile body according to claim 4, wherein the circuitry is further configured to present a predetermined blending parameter in generation of the learned model for the user to adjust, and execute the mechanical learning using the predetermined blending parameter adjusted by the user as the training data.

12. An information processing device comprising:
circuitry configured to
output, to an interface device, a command to execute an operation of prompting a user to specify a blending parameter;
receive, from the interface device, the blending parameter specified by the user,
generate a third motion by blending a predetermined first motion as a motion of an object and a predetermined second motion as a motion of the object different from the predetermined first motion with a reflection degree corresponding to the blending parameter that is received;
reflect the third motion to a motion to be actually performed by the object; and
present predetermined media perceptible from outside of the object in association with the third motion, wherein
the object includes media associated with each of the predetermined first motion and the predetermined second motion, and
the predetermined media is the media associated with one of the predetermined first motion and the predetermined second motion whose final reflection degree in the third motion is higher than that of the other.

13. The information processing device according to claim 12, wherein the object is a mobile body.

14. The information processing device according to claim 12, wherein
the interface device includes a display, and
the object and a motion of the object are displayed on the display.

* * * * *